US012584334B2

(12) United States Patent
Klocke et al.

(10) Patent No.: US 12,584,334 B2

(45) Date of Patent: Mar. 24, 2026

(54) MOTOR VEHICLE DOOR ARRANGEMENT

(71) Applicant: KIEKERT AKTIENGESELLSCHAFT, Heiligenhaus (DE)

(72) Inventors: Tobias Klocke, Solingen (DE); Thorsten Bendel, Oberhausen (DE); Uwe Reddmann, Essen (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 20 days.

(21) Appl. No.: 18/714,312

(22) PCT Filed: Dec. 16, 2022

(86) PCT No.: PCT/DE2022/100962

§ 371 (c)(1),
(2) Date: May 29, 2024

(87) PCT Pub. No.: WO2023/110024

PCT Pub. Date: Jun. 22, 2023

(65) Prior Publication Data

US 2025/0027346 A1 Jan. 23, 2025

(30) Foreign Application Priority Data

Dec. 16, 2021 (DE) ..................... 10 2021 006 215.9

(51) Int. Cl.

*E05B 81/20* (2014.01)
*E05B 81/06* (2014.01)
*E05B 81/70* (2014.01)

(52) U.S. Cl.

CPC .............. *E05B 81/20* (2013.01); *E05B 81/06* (2013.01); *E05B 81/70* (2013.01)

(58) Field of Classification Search

CPC .......... E05B 81/20; E05B 81/21; E05B 81/22; E05B 81/64; E05B 81/70; E05B 81/75

See application file for complete search history.

(56) References Cited

U.S. PATENT DOCUMENTS 5,921,612 A 7/1999 Mizuki
6,241,294 B1 * 6/2001 Young ..................... E05B 77/04 292/336.3

(Continued)

FOREIGN PATENT DOCUMENTS

DE 3721962 A * 1/1989
DE 102011015669 A1 10/2012

(Continued)

OTHER PUBLICATIONS

International Search Report mailed Apr. 12, 2023, for priority International Application No. PCT/DE2022/100962.

*Primary Examiner* — Alyson M Merlino

(74) *Attorney, Agent, or Firm* — Renner, Otto, Boisselle, & Sklar, LLP.

(57) ABSTRACT

A motor vehicle door arrangement is equipped with at least one electromotive drive for positioning a door leaf in a predetermined gap position relative to a motor vehicle body. A state sensor which is connected to a control unit and detects the state of the door leaf is also provided. The control unit acts on the electromotive drive in accordance with signals of the state sensor, wherein the electromotive drive is preferably only acted on if the positioning of the door leaf, based on the state, requires this. According to the invention, for this purpose, the electromotive drive acts on a body component via a switch lever, equipped with its own switch sensor, in order to position the door leaf.

10 Claims, 2 Drawing Sheets

(56) References Cited

U.S. PATENT DOCUMENTS

| | | | | |
|---|---|---|---|---|
| 9,168,884 | B2 * | 10/2015 | Horner | B60R 21/013 |
| 9,382,741 | B2 | 7/2016 | Konchan | |
| 10,557,290 | B2 * | 2/2020 | Scholz | E05B 77/36 |
| 10,633,893 | B2 * | 4/2020 | Harajli | E05B 81/20 |
| 10,934,760 | B2 * | 3/2021 | Khan | E05F 5/00 |
| 11,274,477 | B2 * | 3/2022 | Cumbo | E05B 81/20 |
| 12,129,688 | B2 * | 10/2024 | Reddmann | E05B 81/22 |
| 12,129,704 | B2 * | 10/2024 | Reddmann | E05B 81/20 |
| 2019/0226247 | A1 * | 7/2019 | Johann | E05B 81/20 |
| 2019/0292817 | A1 * | 9/2019 | Tomaszewski | E05B 81/20 |
| 2020/0131836 | A1 * | 4/2020 | Ottino | E05B 81/20 |
| 2020/0284068 | A1 * | 9/2020 | Cumbo | E05B 81/20 |
| 2025/0003263 | A1 * | 1/2025 | Klocke | E05B 81/20 |
| 2025/0163733 | A1 * | 5/2025 | Klocke | E05B 81/20 |

FOREIGN PATENT DOCUMENTS

| | | | | |
|---|---|---|---|---|
| DE | 102016105760 | A1 | 10/2017 | |
| DE | 202016104563 | U1 * | 11/2017 | E05B 81/20 |
| DE | 102019107645 | A1 | 9/2019 | |
| DE | 102018126968 | A1 | 4/2020 | |
| DE | 102019135418 | A1 * | 6/2021 | E05B 81/16 |
| DE | 102021107177 | A1 | 9/2021 | |
| DE | 102020109770 | A1 | 10/2021 | |
| EP | 1191172 | A2 * | 3/2002 | E05B 81/20 |
| EP | 3696355 | A1 * | 8/2020 | E05B 81/20 |
| JP | H03137386 | A | 6/1991 | |
| WO | 2009147866 | A1 | 12/2009 | |

* cited by examiner

MOTOR VEHICLE DOOR ARRANGEMENT

This application is a national phase of International Patent Application No. PCT/DE2022/100962 filed Dec. 16, 2022, which claims priority to German Patent Application No. 10 2021 006 215.9 filed Dec. 16, 2021, each of which is hereby incorporated herein by reference in its entirety.

FIELD OF DISCLOSURE

The invention relates to a motor vehicle door arrangement having at least one electromotive drive for positioning a door leaf in a predetermined gap position relative to a motor vehicle body, and having at least one state sensor which is connected to a control unit and detects the state of the door leaf, wherein the control unit acts on the electromotive drive in accordance with signals of the state sensor, and wherein the electromotive drive is preferably only acted on if the positioning of the door leaf, based on the state, requires this.

BACKGROUND OF DISCLOSURE

Motor vehicle door arrangements use the electromotive drive, by way of example, in order to position the door leaf. For this purpose, the electromotive drive may act on a latch holder and in this way ensure the desired positioning movement, as described in detail, among other things, in DE 10 2020 109 770 A1 from the applicant. Another procedure in this context is the subject matter of DE 10 2011 015 669 A1. In this case, the electromotive drive works on a lever, the rotational movement of which is converted into a movement for positioning the door leaf.

The generic prior art according to DE 10 2021 107 177 A1 relates to a door system for a motor vehicle and additionally a so-called door presenter control. In other words, a power-operated presentation actuator on the motor vehicle body or on the door leaf ensures that the door leaf can be moved between a closed and a presented or open position.

Several different sensors are also queried in this context. These include, by way of example, a position sensor for the catch of an associated motor vehicle latch or for the pawl. In addition, the measures herein describe the determination of the state of the motor vehicle preventing the normal opening of the motor vehicle door or the door leaf. The state sensor in question is queried for this purpose. This may be a temperature sensor.

The prior art has proven successful when it comes to positioning the door leaf in the predetermined gap position relative to the motor vehicle body and, under certain circumstances, breaking through any resistance such as ice.

Such an icebreaker function is also addressed in the further prior art according to DE 10 2019 107 645 A1. For this purpose, the known teaching makes use of an icebreaker cam, with the aid of which, in the sense of the icebreaker function, the positioning of the door leaf is ensured even when the door leaf is frozen. Normally, after the manual or motorized opening of a locking mechanism in an associated motor vehicle door latch, the rubber seal running around the door leaf ensures that the door leaf can then be opened manually or with the aid of an electromotive drive when the motor vehicle door latch is open.

However, if, for example, due to freezing rain or snow, the motor vehicle door latch does not open or does not open fully or the door leaf cannot be opened with the aid of the electromotive drive in connection with a positioning device, the icebreaker function already mentioned must be used. This regularly ensures that the door leaf is released from the circumferential rubber door seal, for example, and the frozen state can be lifted. This often requires high forces to be applied to the door leaf. Forces or positioning forces ranging from several decanewtons up to several hundred newtons are conceivable at this point.

The prior art has proven successful when it comes to generally implementing the icebreaker function. In addition, the generic document DE 10 2021 107 177 A1 already addresses the possibility that the electromotive drive only performs the icebreaker function when the state of the motor vehicle prevents the door leaf from opening normally. In this context, a temperature sensor can also be queried, for example, which may indicate that the door leaf is moving relative to the rubber door seal.

However, not all aspects of the measures described are satisfactory. In the generic teaching, a so-called power-operated swing door actuator is used, which is independent of the motor vehicle door latch. This ensures that the door leaf is moved between a closed and fully open position. Furthermore, a so-called presentation actuator is then additionally implemented, which is acted on depending on the command to release a lock and a state of the motor vehicle. The power-operated presentation actuator is arranged independently of an additionally provided motor vehicle latch or motor vehicle door latch on a rear edge of the door leaf remote from the axis.

The result of this is an extremely complex structure with high costs. The bottom line is that the motor vehicle latch, and in particular the motor vehicle door latch, is usually equipped with its own electromotive drive for electromotive opening. In addition, the generic teaching relies on a further electromotive drive for the presentation actuator and, finally, a further third electromotive drive is required in connection with the power-operated swing door actuator. As a result of these separate designs, it is ultimately not necessary to monitor the electromotive drive for the door leaf and its functionality.

SUMMARY OF DISCLOSURE

The invention is based on the technical object of further developing such a motor vehicle door arrangement in such a way that the actuating movement of the electromotive drive for positioning the door leaf can be monitored while taking into account a compact and cost-effective design.

To achieve this technical object, the invention proposes in a generic motor vehicle door arrangement that the electromotive drive acts on a body component via a switch lever, equipped with its own shift sensor, in order to position the door leaf.

According to an advantageous embodiment, the body component in question is generally a latch holder connected to the motor vehicle body. It has also proved useful in this context if the electromotive drive is arranged inside a motor vehicle latch and, in particular, a motor vehicle door latch.

In this way, a particularly compact and cost-effective design is initially made available and implemented. This is because the electromotive drive for positioning the door leaf in the predetermined gap position is typically located inside the motor vehicle latch, which is already fitted on or in the door leaf. The motor vehicle latch in question is usually a motor vehicle door latch. In this way, in addition to the so-called "icebreaker function", the electromotive drive can also generally perform other drive functions inside the motor vehicle latch, for example basically ensuring the electromotive opening of a locking mechanism provided inside the motor vehicle latch and, in particular, the motor vehicle door latch, substantially consisting of a catch and a pawl.

In order to position the door leaf in the predetermined gap position, the electromotive drive in question now operates via the switch lever on the body component or the latch holder. The invention is based on the knowledge that the latch holder in question is already located inside the motor vehicle latch or motor vehicle door latch when the door leaf is closed, or is retracted into it.

As a result, the electromotive drive can initially open the locking mechanism in a first step by lifting the pawl from its latching engagement with the catch in the main closed position or main latching position assumed in the closed state. As a result, the catch usually opens with spring support and the door leaf moves away from the motor vehicle body, at least in gaps, supported by counter-spring forces generated by a circumferential rubber door seal. If such a movement does not occur or is not observed after the electromotive opening, the so-called "icebreaker function" is used.

This is because the electromotive drive in question (or another electromotive drive present in the motor vehicle latch) then operates via the switch lever on the body part or the latch holder and, through the force transmission achieved in this way, ensures that the door leaf is at least positioned in the predetermined gap position relative to the motor vehicle body. This predetermined gap position corresponds to the door leaf being released from the circumferential rubber door seal inside the motor vehicle body. This usually requires forces of several decanewtons or several hundred newtons to be able to adjust the predetermined gap position and the associated gap of the door leaf relative to the motor vehicle body. In this context, gaps of a few millimeters to 10 mm or even more between the door leaf and the motor vehicle body have proven to be favorable in this context.

In this way, the electromotive drive inside the motor vehicle latch and in particular the motor vehicle door latch ensures that even if the door leaf is iced up, the door leaf in question is positioned at least far enough relative to the motor vehicle body that an operator can grasp the door leaf and swing it open manually via the gap of a few millimeters up to 10 mm or even more that is then provided. In this context, it is of course also possible for the door leaf to be equipped with its own door leaf drive, which, following the icebreaker function described above, ensures that the door leaf is moved into the fully open position. In any case, the path taken by the door leaf relative to the motor vehicle body in connection with the icebreaker function can now be easily traced and determined, because the electromotive drive acts on the body part or the latch holder connected to the motor vehicle body via the switch lever equipped with its own switch sensor. With the aid of the switch sensor, this movement can be tracked precisely in the control unit. The control unit can also be used to determine whether the predetermined gap position has been reached or not. Depending on this, the control unit can then be used to control an additional and optional door drive for the door leaf, for example.

It is of further inventive importance that the electromotive drive is preferably only acted on if the positioning of the door leaf, based on the state, requires this. This means that, as a rule, the electromotive drive in question is only acted on if the state of the door leaf indicates that the door leaf has frozen or otherwise stuck to the circumferential rubber door seal inside the motor vehicle body. In order to be able to determine the state of the door leaf and consequently the control of the electromotive drive based on the state, a state sensor which detects the state of the door leaf is provided.

In other words, the state sensor can be used to detect a state that prevents the door leaf from opening normally relative to the motor vehicle body. This state preventing normal opening usually corresponds to the door leaf being frozen to the rubber door seal or even connected to the motor vehicle body by a continuous layer of ice, for example. In principle, it is of course also conceivable that such a state preventing the door leaf from opening normally corresponds to the rubber door seal completely or partially "sticking" to the door leaf due to the effect of heat, for example. In such a case, the state sensor can also be used to detect this state preventing the door leaf from opening normally relative to the motor vehicle body.

For this purpose, the state sensor is advantageously and by way of example a temperature sensor. Such a temperature sensor is already present in most motor vehicles, so that its values can be used advantageously to draw conclusions about the state of the door leaf. Alternatively or additionally, the state sensor can also be a displacement sensor on the door leaf. A door seal sensor on or in the door seal is also conceivable. This door seal sensor can be used, for example, to determine whether the door seal in question is relieved by the open locking mechanism after the motor vehicle latch has been opened or whether it retains its compressed state. The door seal sensor then indicates a state preventing the door leaf from opening normally.

In other words, the door seal sensor can be used, for example, to detect deformation or a deformation state of the door seal or its temperature, any excess pressure inside the door seal, etc., which can be used to evaluate the state of the door leaf.

Alternatively or additionally, however, it is also conceivable that the state sensor is a door closing sensor, i.e., a sensor which is already and often routinely implemented in a motor vehicle, namely in such a way that it is used to detect the closed state of the relevant door leaf. For this purpose, the distance between the door leaf and the motor vehicle body is regularly determined using the door closing sensor (usually a door closing switch). In principle, the state sensor can alternatively or additionally be provided and designed as a door latch sensor for detecting a main latching position. In this case, the state sensor is arranged as a door latch sensor inside the previously mentioned motor vehicle latch and, in particular, the motor vehicle door latch. It is used to detect the assumption of the main latching position. For this purpose, the door latch sensor in question can typically be a catch sensor that is usually already present, namely a sensor arranged on the circumference of the catch, which is used to determine the main latching position of the catch.

It is understood that the different state sensors described in detail above are queried both individually and in combination using the mandatory control unit in addition to the switch sensor. For example, it is conceivable to query both the already provided door closing sensor and the door latch sensor together to determine whether or not the door leaf has completed an opening movement relative to the motor vehicle body, for example following an electromotive opening process of the motor vehicle latch and, in particular, the motor vehicle door latch. If this is not the case or not sufficiently the case, this indicates that the door leaf is frozen to the door seal or that a state exists that prevents the door leaf from opening normally.

According to a further advantageous embodiment, in addition to the state sensor for detecting the state of the door leaf, a constellation sensor of the motor vehicle can also be evaluated by the control unit mentioned above. This constellation sensor can, for example, be a rain sensor or an impact sensor or a crash sensor.

The constellation sensor in question can be used to determine the constellation of the motor vehicle, for example if the motor vehicle is exposed to rain. In such a case, and if the door leaf is prevented from opening normally relative to the motor vehicle body, particularly dangerous freezing rain can be assumed. As a rule, however, the signal from a rain sensor, for example in conjunction with the temperature sensor, indicates that the door leaf cannot be frozen to the door seal or circumferential rubber door seal inside the motor vehicle body because the prevailing outside temperatures simply prevent this. In this case, for example, the state preventing the door leaf from opening normally relative to the motor vehicle body may indicate that the associated motor vehicle latch or the locking mechanism inside has not been fully opened.

The constellation sensor used at this point and, for example, the rain sensor can be a sensor which is also often routinely present in or on the motor vehicle and can thus be easily integrated into the motor vehicle door arrangement according to the invention. In fact, such rain sensors are known, for example, in connection with the control of windshield wipers and detect the size and number of droplets hitting a windshield. Other rain sensors operate with microphones arranged in a wheel arch, for example, and are used to make adjustments to the suspension and/or throttle response and shift characteristics in an automatic transmission.

In the event that the constellation sensor of the motor vehicle is designed as an impact sensor or a crash sensor, the query by the control unit can be used to ensure that in such a case the electromotive drive for opening the door leaf is simply not acted on because the triggering of the impact sensor or crash sensor indicates an accident and therefore damage to the motor vehicle body, which usually also results in the door leaf being wedged against the motor vehicle body and cannot be opened. This could possibly lead to damage to the electromotive drive if it is nevertheless acted on.

Conversely, it is also conceivable that signals from the impact sensor could be used as a constellation sensor in order to position the door leaf in question and thus allow incoming rescue personnel easy access to the interior of the motor vehicle. Such an approach is usually chosen for security reasons. Either way, the control unit is set up to evaluate in a combinatorial manner both the state sensor and the constellation sensor—in addition to the switch sensor—in order to act on the electromotive drive. This allows precise conclusions to be drawn about the state of both the motor vehicle and the door leaf and can be processed accordingly by the control unit.

According to a further advantageous embodiment, the electromotive drive for positioning the door leaf is acted on at least up to an icebreaker position that can be detected using the switch sensor. The icebreaker position regularly corresponds to the predetermined gap position or a specific value, generally stored in the control unit, for the gap achieved in this way between the door leaf and the motor vehicle body. In other words, the movement of the electromotive drive and consequently also of the door leaf relative to the motor vehicle body can be detected and transmitted to the control unit via the switch sensor assigned to the switch lever. Only when the switch sensor has determined whether the icebreaker function or the associated gap has been reached does the control unit ensure that the electromotive drive is stopped.

Conversely, the electromotive drive is advantageously only required and acted on when the state of the door leaf actually requires this, i.e., the door leaf is usually frozen against the door seal or circumferential rubber door seal. As a result, the electromotive drive as a whole is protected and is only used when necessary and required for the icebreaker function. This means that the electromotive drive and the associated drive elements can also be constructed in such a way that only a relatively limited number of operations can be completed over the life of the motor vehicle. Of course, this can also be changed on a regional basis. In other words, in the case of a motor vehicle that is delivered to arctic or cold regions, for example, the electromotive drive and its associated drive elements will be constructed to be correspondingly stronger compared to a motor vehicle that is delivered to hot areas or regions, for example.

In order to provide the force required by the electromotive drive to act on the latch holder, the electromotive drive generally operates via a transfer lever on the previously mentioned switch lever. This allows a kind of transmission ratio to be achieved. The switch lever is also generally arranged inside a latch case of the previously mentioned motor vehicle latch. In this context, a bearing with the same axis as the catch in the latch case has also proven to be particularly advantageous. This is because the axis of the catch is already particularly stable and solid with a corresponding bearing pin that is anchored in the latch case. As a result, the forces referred to from the switch lever can be easily transmitted to the latch holder acted on thereby or, in general, to the body component for positioning the door leaf.

The motor vehicle door arrangement according to the invention is generally and broadly understood to be any flap arrangement connected to the motor vehicle body. In other words, the motor vehicle door arrangement is not necessarily designed as a motor vehicle swing door. In principle, this can also be a hood, a tailgate, a tailboard, a fuel tank cap, etc. However, the motor vehicle door arrangement can just as easily be constructed as a motor vehicle sliding door arrangement.

In any case, the invention provides a particularly compact and functional embodiment that is equipped with synergetic advantages. This is because the electromotive drive for positioning the door leaf is generally a component of a motor vehicle latch, and in particular a motor vehicle door latch, which is already provided. This means that a separate housing, additional attachments etc., are expressly unnecessary.

Furthermore, it is possible within the scope of the invention that the electromotive drive inside the motor vehicle latch can be used not only for positioning the door leaf and thus for the icebreaker function described, but can also perform other functions inside the motor vehicle latch. One example of this is the electromotive opening of the locking mechanism consisting of a catch and a pawl. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
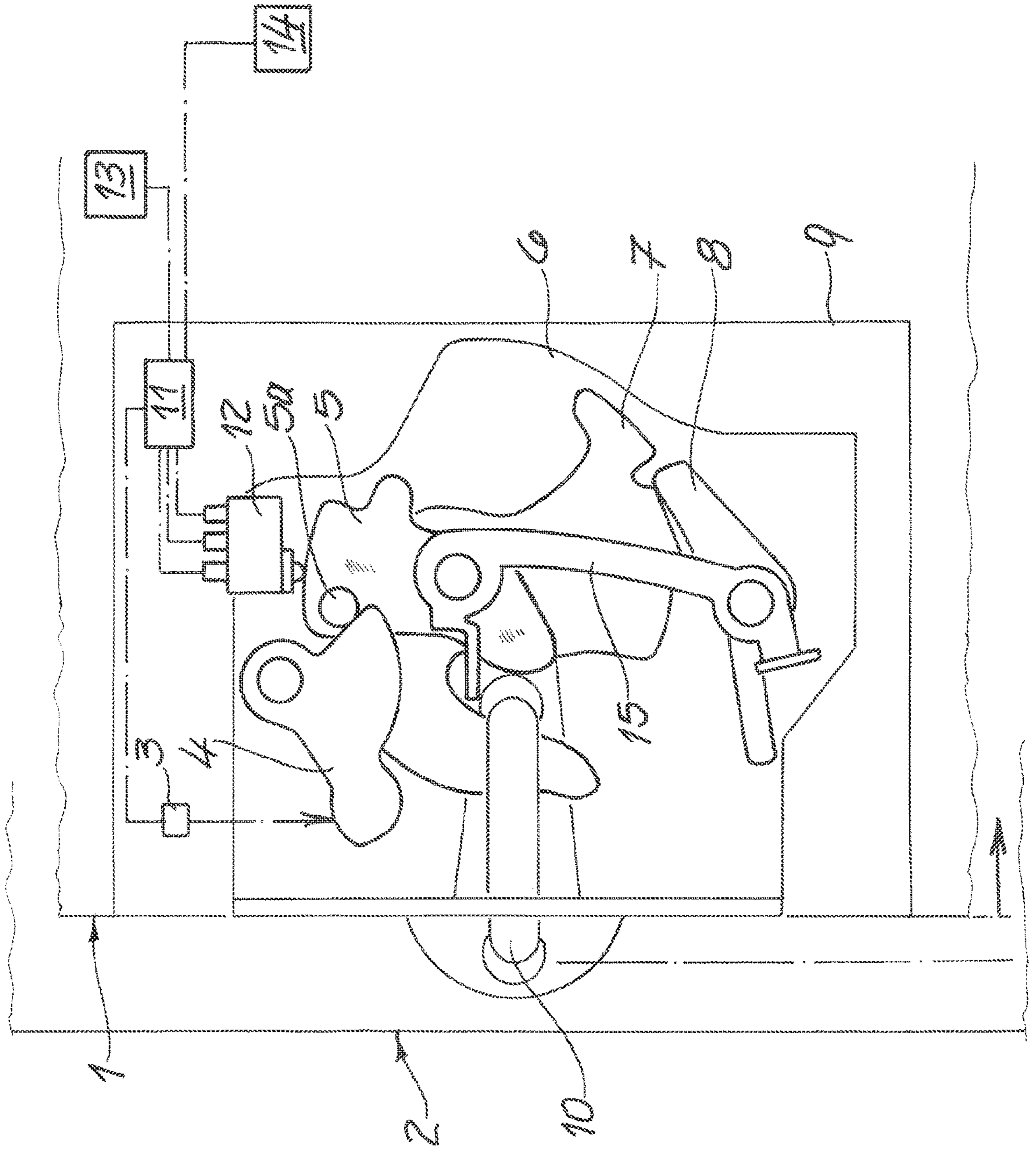
FIG. 1 schematically shows the motor vehicle door arrangement according to the invention and FIG. 2A to 2C show the motor vehicle door arrangement reduced to the essential components in various functional positions.

The figures show a motor vehicle door arrangement having at least one door leaf 1 which can be swung open and opened relative to a motor vehicle body 2, as indicated by a corresponding arrow in FIG. 1. For this purpose, the door leaf 1 can be pivoted about an axis that is not explicitly shown. The door leaf 1 is in fact a side door leaf, which is of course only an example and is not limiting. This means that the door leaf can also be a tailgate, a hood, etc.

The basic structure of the motor vehicle door arrangement shown comprises at least one electromotive drive 3, which is only shown as an arrow or box in the figures for reasons of clarity. In fact, the electromotive drive 3 generally has an electric motor and a downstream transmission, with the aid of which it operates via a transfer lever 4 on a switch lever 5 in the exemplary embodiment. Like the switch lever 5, the transfer lever 4 is mounted in a latch case 6.

The same applies to a locking mechanism 7, 8 consisting of a catch 7 and a pawl 8. FIG. 2*a* shows the locking mechanism 7, 8 in a main closed state or main latching state or in its main latching position. The latch case 6, the locking mechanism 7, 8 mounted therein, the transfer lever 4, the switch lever 5 and also the electromotive drive 3 together represent components of a motor vehicle latch and in particular a motor vehicle door latch, which is indicated in FIG. 1 by an enclosing housing 9 in which all the components are located.

The motor vehicle latch or its locking mechanism 7, 8 interacts in the usual manner with a body component 10 of the motor vehicle body 2. As shown in FIG. 1, the body component 10 of the motor vehicle body 2 in question is a latch holder 10 connected to the motor vehicle body 2. In the exemplary embodiment according to FIG. 1, the latch holder 10 is fully retracted into the locking mechanism 7, 8 which is in the main latching position. This corresponds to the fact that the door leaf 1 is closed relative to the motor vehicle body 2.

In addition, at least one control unit 11 is implemented, which according to the exemplary embodiment can be arranged inside or outside the motor vehicle latch housing 9. The control unit 11 is used not only to act on the electromotive drive 3, but also to detect and evaluate signals from a state sensor 13. The state of the door leaf 1 is detected using the state sensor 13, as already described and explained in more detail below.

In fact, the electromotive drive 3 is used to position the door leaf 1 in a predetermined gap position, which is part of a gap S shown in FIG. 2C relative to the motor vehicle body 2. In this exemplary embodiment, the gap S can range from several millimeters to 10 mm and more. As a result, the door leaf 1 positioned in this way can be grasped by an operator or user of the motor vehicle and swung fully open, for example manually.

According to the exemplary embodiment, the electromotive drive 3 is only acted on if the positioning of the door leaf 1, based on the state, requires this. The state sensor 13 is provided for this purpose. In the context of the exemplary embodiment and not by way of limitation, the state sensor 13 is a temperature sensor 13, which may already be arranged inside the motor vehicle body 2 obligatorily. As soon as this state sensor 13 detects that the door leaf 1 is frozen or may be frozen, the control unit 11, which evaluates the signals from the state sensor 13, ensures that the electromotive drive 3 for positioning the door leaf 1 is moved to the predetermined gap position shown in FIG. 2C with the associated gap S relative to the motor vehicle body 2 (icebreaker function). As the electromotive drive 3 is typically only acted on in rare cases and depending on the state of the door leaf 1, the electromotive drive 3 can otherwise be protected. However, it is also possible that the electromotive drive 3 inside the motor vehicle latch is used alternatively and additionally to open the locking mechanism 7, 8, although this is not shown in detail.

According to the invention, the construction is now such that the electromotive drive 3 acts on a body component 10, and specifically the latch holder 10, in order to position the door leaf 1 via the switch lever 5 equipped with its own switch sensor 12. For this purpose, the electromotive drive 3 operates via the transfer lever 4 on the switch lever 5. This can be seen by comparing the sequence of functions in FIG. 2A to 2C.

Figure 2:
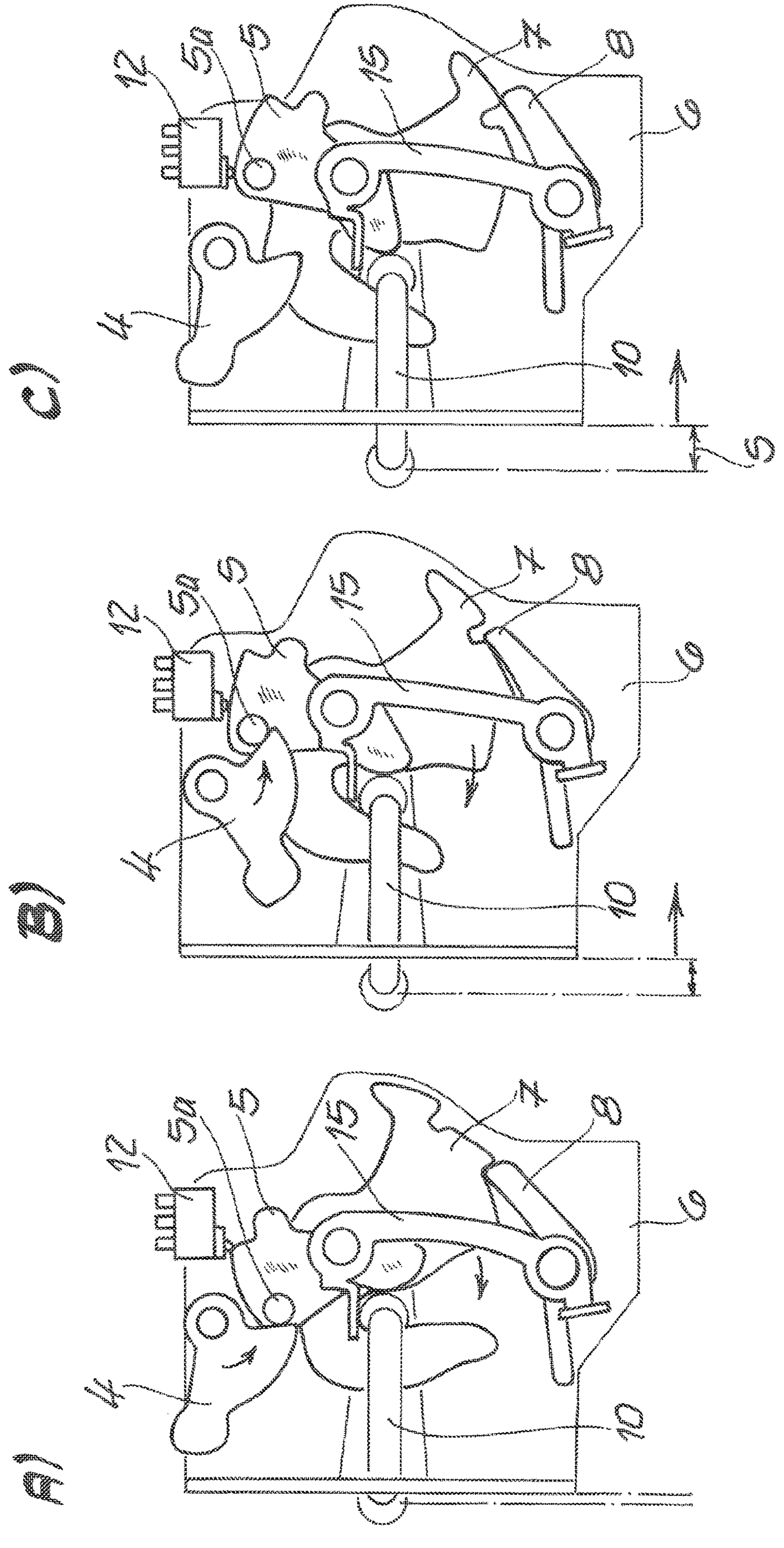

FIG. 2A shows the closed state of the door leaf 1 relative to the motor vehicle body 2. If, based on this, the electromotive drive 3 now acts on the transfer lever 4 during the transition from FIG. 2A to FIG. 2B in such a way that the transfer lever 4 performs a counterclockwise movement about its axis, the transfer lever 4 ensures, via a stop 5*a* arranged on the switch lever 5 and acted on thereby, that the switch lever 5 is in turn pivoted about the common axis with the catch 7 in the indicated clockwise direction. Since the end of the switch lever 5 opposite the stop 5*a* relative to the axis common to the catch 7 is supported on the body component or the latch holder 10, the clockwise pivoting movement of the switch lever 5 initiated by the electromotive drive 3 ensures that the motor vehicle latch as a whole, and thus also the door leaf 1, moves away from the motor vehicle body 2 until the gap S between the door leaf 1 and the motor vehicle body 2 shown in FIG. 2C at the end of this movement is present. The electromotive drive 3 typically transmits forces to the latch holder 10 that can amount to several decanewtons and can assume values of up to 70 decanewtons or 700 newtons in the present case. This also allows, for example, frozen door leaves 1 to be released from the motor vehicle body 2 in the sense of the icebreaker function realized in this way and transmitted to the gap position corresponding to the gap S in FIG. 2.

As already explained, the state sensor or temperature sensor 13 is used to detect a state preventing the door leaf 1 from opening normally relative to the motor vehicle body 2. This state of the door leaf 1 corresponds, by way of example, to the door leaf 1 being frozen to a circumferential door seal or rubber door seal in the motor vehicle body 2, which is not explicitly shown. The control unit 11 now evaluates signals from this state sensor or temperature sensor 13 in the exemplary embodiment. In addition, signals from a constellation sensor 14 of the motor vehicle can also be evaluated by the control unit 11. This constellation sensor 14 is, by way of example, a rain sensor 14.

The control unit 11 now evaluates both the state sensor 13 and the constellation sensor 14 in a combinatorial manner to act on the electromotive drive 3. Only when the control unit 11 determines that the door leaf 1 actually assumes or has assumed the state preventing normal opening relative to the motor vehicle body 2 does the control unit 11 ensure that the electromotive drive 3 is acted on accordingly in order to be able to position the door leaf 1—as described—relative to the motor vehicle body 2, according to the exemplary embodiment, until the predetermined gap position and the gap S shown in FIG. 2C is reached.

At the same time, the associated movement of the switch lever 5 can be monitored in this context, because the switch lever 5 is scanned using the switch sensor 12, the signals of which are in turn evaluated by the control unit 11. The overall construction is such that the electromotive drive 3 for positioning the door leaf 1 is acted on at least up to an icebreaker position that can be detected using the switch sensor 12. According to the exemplary embodiment, this icebreaker position corresponds to the door leaf 1 occupying the gap S relative to the motor vehicle body 2, as shown in FIG. 2C. This includes values of the gap S ranging from a few millimeters up to 10 mm or even more.

As soon as the door leaf 1 has reached the gap position in question and the corresponding gap S, this means for the control unit 11 that the door leaf 1 is free relative to the motor vehicle body 2 and any layer of ice has been broken up. As a result of this, the control unit 11 can then act on a door drive, which is not explicitly shown and is additionally and optionally provided, which in turn ensures that the door leaf 1 can be fully opened from the gap-open position using the door drive. Of course, the door leaf 1 can then also be closed by motor using the door drive in question. A purely manual opening of door leaf 1 is also possible.

It can be seen that the axis of the pawl 8 and that of the catch 7 as well as the axis of the switch lever 5, which is mounted on the same axis as the catch 7, are coupled together via a connecting bridge 15. As a result, the latch case 6 is additionally stiffened and the forces described can be easily built up with the aid of the electromotive drive 3 and finally transmitted to the latch holder 10 via the transfer lever 4 and the switch lever 5. These are the main advantages.

LIST OF REFERENCE SIGNS

- 1 Door leaf
- 2 Motor vehicle body
- 3 Electromotive drive
- 4 Transfer lever
- 5 Switch lever
- 5*a* Stop
- 6 Latch case
- 7,8 Locking mechanism
- 7 Catch
- 8 Pawl
- 9 Housing
- 10 Body component or latch holder
- 11 Control unit
- 12 Switch sensor
- 13 State sensor/temperature sensor
- 14 Rain sensor
- 15 Connecting bridge
- S Gap

The invention claimed is:

1. A motor vehicle door arrangement comprising:

an electromotive drive for positioning a door leaf in a predetermined gap position relative to a motor vehicle body, a control unit, a state sensor which is connected to the control unit and detects a state of the door leaf, wherein the control unit acts on the electromotive drive in accordance with signals received from the state sensor, and wherein the electromotive drive is only acted on when the positioning of the door leaf, based on the state of the door leaf, requires action by the electromotive drive to position the door leaf, a switch lever having a switch sensor, wherein the switch lever directly acts on a latch holder connected to the motor vehicle body, and wherein the electromotive drive acts on the switch lever to position the door leaf such that the switch lever rotates when acted on by the electromotive drive; and a motor vehicle door latch including a catch and a latch case, wherein the switch lever is arranged inside the latch case and is mounted on a same axis as the catch in the latch case.

2. The arrangement according to claim 1, further comprising a motor vehicle door latch, wherein the electromotive drive is arranged inside the motor vehicle door latch.

3. The arrangement according to claim 1, wherein the state sensor is used to detect a state preventing normal opening of the door leaf relative to the motor vehicle body.

4. The arrangement according to claim 1, wherein the state sensor is one or more of a temperature sensor, a displacement sensor on the door leaf, a door seal sensor on or in a door seal, a door closing sensor, or a door latch sensor for detecting a main latching position.

5. The arrangement according to claim 1, further comprising an additional sensor of the motor vehicle which is additionally evaluated by the control unit.

6. The arrangement according to claim 5, wherein the additional sensor is a rain sensor or an impact sensor.

7. The arrangement according to claim 5, wherein the control unit evaluates the state sensor and the additional sensor in a combinatorial manner to act on the electromotive drive.

8. The arrangement according to claim 1, wherein the predetermined gap position is an icebreaker position, and wherein the electromotive drive for positioning the door leaf is acted on at least up to the icebreaker position.

9. The arrangement according to claim 1, further comprising a transfer lever, wherein the electromotive drive operates via the transfer lever on the switch lever.

10. The arrangement according to claim 1, wherein the control unit acts on the electromotive drive when the state of the door leaf, detected by the state sensor, indicates that the door leaf is frozen to or otherwise stuck relative to the motor vehicle body.

* * * * *